US008600801B2

(12) United States Patent
Brandt et al.

(10) Patent No.: US 8,600,801 B2
(45) Date of Patent: Dec. 3, 2013

(54) METHODS AND APPARATUS TO DEFLECT CALLERS TO WEBSITES

(75) Inventors: Jeffrey Brandt, Cedar Park, TX (US); Angela Sandoval, Austin, TX (US); Douglas F. Reynolds, Austin, TX (US); Aaron Bangor, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1273 days.

(21) Appl. No.: 11/668,812

(22) Filed: Jan. 30, 2007

(65) Prior Publication Data
US 2008/0183570 A1 Jul. 31, 2008

(51) Int. Cl.
*G06Q 30/00* (2012.01)

(52) U.S. Cl.
USPC ..................... 705/14.1; 379/266.01

(58) Field of Classification Search
USPC .................. 379/265, 266; 705/14.1
See application file for complete search history.

(56) References Cited

U.S. PATENT DOCUMENTS

| | | | |
|---|---|---|---|
| 4,945,570 A * | 7/1990 | Gerson et al. ................. | 455/563 |
| 5,949,419 A * | 9/1999 | Domine et al. ................ | 715/744 |
| 6,115,693 A | 9/2000 | McDonough et al. | |
| 6,256,614 B1 | 7/2001 | Wecker et al. | |
| 6,334,108 B1 | 12/2001 | Deaton et al. | |
| 6,477,531 B1 * | 11/2002 | Sullivan et al. ........................ | 1/1 |
| 6,574,606 B1 | 6/2003 | Bell et al. | |
| 6,658,598 B1 * | 12/2003 | Sullivan ............................ | 714/25 |
| 6,885,995 B2 | 4/2005 | Bell et al. | |
| 6,901,380 B1 | 5/2005 | Bremers | |
| 6,928,549 B2 * | 8/2005 | Brock et al. ................... | 713/194 |
| 6,934,684 B2 | 8/2005 | Alpdemir et al. | |
| 6,975,720 B1 | 12/2005 | Crook | |
| 7,023,979 B1 | 4/2006 | Wu et al. | |
| 7,032,030 B1 | 4/2006 | Codignotto | |
| 7,076,051 B2 * | 7/2006 | Brown et al. ............ | 379/265.09 |
| 7,095,842 B2 | 8/2006 | Brown et al. | |
| 7,127,059 B2 * | 10/2006 | Galvin ..................... | 379/265.03 |
| 7,139,390 B2 * | 11/2006 | Brown et al. ............ | 379/265.02 |
| 7,346,656 B2 | 3/2008 | Worthen | |
| 7,398,224 B2 | 7/2008 | Cooper | |
| 7,430,521 B2 | 9/2008 | Walker et al. | |
| 7,493,553 B1 * | 2/2009 | Vora et al. ..................... | 715/205 |
| 7,512,545 B2 | 3/2009 | Knott et al. | |
| 7,533,419 B2 * | 5/2009 | Paya et al. ........................ | 726/26 |
| 7,565,367 B2 | 7/2009 | Barrett et al. | |
| 7,644,035 B1 | 1/2010 | Biffle et al. | |
| 7,840,578 B2 | 11/2010 | Ha et al. | |
| 8,472,612 B1 | 6/2013 | Goringe et al. | |
| 2002/0035647 A1 * | 3/2002 | Brown et al. ................. | 709/312 |

(Continued)

OTHER PUBLICATIONS

Merriam-Webster's Collegiate Dictionary, Tenth Edition (Merriam-Webster, Incorporated, 1998) at p. 1229.*

(Continued)

*Primary Examiner* — John G Weiss
*Assistant Examiner* — Bennett Sigmond
(74) *Attorney, Agent, or Firm* — Hanley, Flight & Zimmerman, LLC

(57) ABSTRACT

Methods and apparatus to deflect callers to websites are disclosed. An example method disclosed herein to deflect a caller to a webpage comprises receiving a call from the caller, identifying a webpage based on information characterizing the call, and providing an address of the webpage to the caller when the caller consents to terminate the call.

21 Claims, 7 Drawing Sheets

(56) References Cited

U.S. PATENT DOCUMENTS

| | | | |
|---|---|---|---|
| 2003/0004802 A1 | 1/2003 | Callegari | |
| 2003/0040965 A1 | 2/2003 | Gelissen | |
| 2003/0041021 A1 | 2/2003 | Kogler et al. | |
| 2003/0194064 A1 | 10/2003 | Lee et al. | |
| 2003/0200190 A1* | 10/2003 | Adar et al. | 706/45 |
| 2004/0044585 A1 | 3/2004 | Franco | |
| 2004/0110495 A1* | 6/2004 | Yanagisawa et al. | 455/414.1 |
| 2004/0117322 A1 | 6/2004 | Bjorksten et al. | |
| 2004/0181602 A1* | 9/2004 | Fink | 709/229 |
| 2004/0249712 A1 | 12/2004 | Brown et al. | |
| 2005/0137922 A1* | 6/2005 | Blackwood et al. | 705/8 |
| 2005/0163296 A1* | 7/2005 | Smith et al. | 379/114.2 |
| 2005/0198087 A1 | 9/2005 | Bremers | |
| 2006/0002538 A1 | 1/2006 | Dezonno | |
| 2007/0116231 A1* | 5/2007 | DeGraaff et al. | 379/212.01 |
| 2007/0214038 A1 | 9/2007 | Dolph | |
| 2007/0271466 A1 | 11/2007 | Mak et al. | |
| 2008/0162475 A1 | 7/2008 | Meggs et al. | |
| 2008/0183516 A1 | 7/2008 | Brandt et al. | |
| 2008/0183569 A1 | 7/2008 | Brandt et al. | |

OTHER PUBLICATIONS

United States Patent and Trademark Office, "Office Action," issued in connection with U.S. Appl. No. 11/668,809, mailed on Dec. 8, 2010, (54 pages).

United States Patent and Trademark Office, "Office Action," issued in connection with U.S. Appl. No. 11/668,789, mailed on Dec. 7, 2010, (47 pages).

United States Patent and Trademark Office, "Final Office Action," issued in connection with U.S. Appl. No. 11/668,809, on Jun. 16, 2011 (22 pages).

United States Patent and Trademark Office, "Office Action," issued in connection with U.S. Appl. No. 11/668,809, on Apr. 25, 2012 (31 pages).

United States Patent and Trademark Office, "Final Office Action," issued in connection with U.S Appl. No. 11/668,789 on May 17, 2011 (21 pages).

United States Patent and Trademark Office, "Office Action," issued in connection with U.S. Appl. No. 11/668,789 on May 18, 2012 (18 pages).

USPTO, "Notice of Allowance," issued in connection with U.S. Appl. No. 11/668,809, dated Jan. 8, 2013 (12 pages).

USPTO, "Notice of Allowance," issued in connection with U.S. Appl. No. 11/668,789, dated Dec. 31, 2012 (7 pages).

Consortium for Service Innovation, KCS Measurement Matters, The Benefits and Organizational Measures of Knowledge-Centered Support, v1.2, Copyright 2007 (25 pages).

United States Patent and Trademark Office, "Office Action," issued in connection with U.S. Appl. No. 13/871,442, on Aug. 12, 2013 (17 pages).

United States Patent and Trademark Office, "Office Action," issued in connection with U.S. Appl. No. 13/871,445, on Aug. 12, 2013 (23 pages).

* cited by examiner

METHODS AND APPARATUS TO DEFLECT CALLERS TO WEBSITES

FIELD OF THE DISCLOSURE

This disclosure relates generally to call center processing and, more particularly, to methods and apparatus to deflect callers to websites.

BACKGROUND

Businesses often employ call centers to provide service for their callers (e.g., customers). For example, a call center may act as a customer support center, a sales outlet or an information kiosk for one or more products or services offered by a business. Call centers typically use automated call routing techniques to route incoming calls to appropriate destinations in the call center, such as, for example, a customer support technician, a sales representative, an operator, etc. Call centers may also use interactive voice systems to, for example, present a welcoming message to customers contacting the call center, provide information concerning products and/or services offered by the business operating the call center, and/or prompt customers to provide information for use by the automatic call routing techniques. In some applications, the welcoming message may include an invitation for customers to access a website associated with the call center or the business operating the call center.

DETAILED DESCRIPTION

Figure 1:
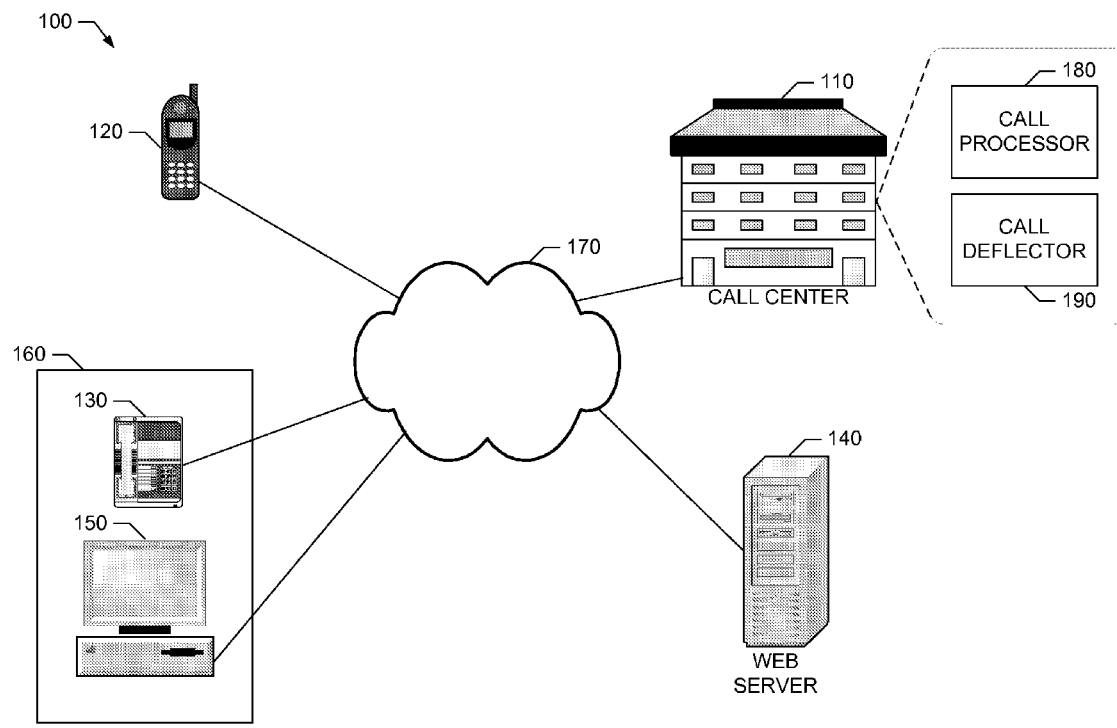
FIG. 1 is a block diagram of an example caller support system capable of deflecting an incoming caller to a website.

A block diagram of an example caller support system 100 capable of deflecting incoming callers to one or more webpages associated with one or more websites is illustrated in FIG. 1. The example caller support system 100 includes a call center 110. The example call center 110 may correspond to, for example, a customer support call center, a sales call center, an information query call center, etc. The example call center 110 is configured to receive incoming calls from callers via any type of phone, such as, for example, a mobile phone 120, a land line phone 130, etc. The mobile phone 120 of the illustrated example may be compatible with any type of mobile phone communications service, such as, for example, an Advanced Mobile Phone System (AMPS) service, a Time Division Multiple Access (TDMA) service, a Code Division Multiple Access (CDMA) service, a Universal Mobile Telecommunications System (UMTS) service, a satellite communications service, etc. The land line phone 130 of the illustrated example may be compatible with any type of land line communications service, such as, for example, the Public Switched Telephone Network (PSTN), a Voice-over-Internet Protocol (VoIP) service, etc. The term caller as used herein refers to any incoming caller to the call center 110, including, but not limited to, employees, potential customers, customary clients, competitors and/or parties having no relation to the call center 110.

The example caller support system 100 also includes a web server 140 configured to host a website associated with the example call center 110. For example, the website hosted by the web server 140 of the illustrated example may provide self-service customer support, sales portals and/or information kiosks for services and/or products associated with the call center 110. Furthermore, one or more webpages associated with the website and served by the web server 140 may be personalized to individual callers of the call center 110 based on, for example, caller identification information, account information, etc. associated with each individual caller or group of callers. The webpages served by the web server 140 may be accessed by a caller to the call center 110 via, for example, the mobile phone 120 or a computer 150 co-located with the land line phone 130 at a caller site 160 as shown. For example, the mobile phone 120 may implement a Wireless Application Protocol (WAP) or similar Internet browser capable of accessing the one or more webpages served by the web server 140. The computer 150 may correspond to any type of computing device, such as, for example, a personal computer, a notebook computer, a personal digital assistant (PDA), a gaming console, another mobile phone, etc.

In the example caller support system 100, the call center 110, the mobile phone 120, the land line phone 130, the web server 140 and the computer 150 are connected via a network 170 as shown. In some implementations, the network 170 of the illustrated example may be implemented by a single network technology, such as, for example, a digital mobile phone system (e.g., such as a TDMA, CDMA or UMTS system), a system capable of supporting both VoIP and data communications (e.g., such as AT&T's Lightspeed access network), the Internet, etc. In other implementations, the network 170 of the illustrated example may be implemented by multiple network technologies, such as, for example, a voice communications network for voice services (e.g., such as the PSTN, a mobile telecommunications system, etc.) and a data communications network for data services (e.g., such as a digital subscriber line (DSL) system, the Internet, etc.).

Under certain circumstances discussed in greater detail below, a caller to the example call center 110 may select whether to continue the call with the call center 110 or to terminate the call in favor of accessing an identified webpage served by the web server 140. The identified webpage is tailored to process the caller's request, provide the assistance (e.g., technical support) desired by the caller, etc. An example call processor 180 included in the call center 110 employs automated call-routing techniques to obtain information from the caller to characterize the purpose of the call, the caller's identity, etc. In addition to using the characterizing information to route the call to the appropriate call center destination, the example call processor 180 provides the information to an example call deflector 190. The example call deflector 190 of FIG. 1 employs action-object technology to identify one or more webpages relevant to the characterizing information associated with the call. However, other techniques, such as heuristics, could be used. Additionally, the identified webpages may be ranked according to relevancy and the example call deflector 190 configured to select the webpage with the highest ranking. Furthermore, if no relevant webpage is identified, then a default general-purpose webpage may be selected by the example call deflector 190 in lieu of a personalized webpage.

The example call center 110 then offers the caller the option of accessing a webpage identified by the example call deflector 190 instead of continuing the call with the call center 110. If the caller accepts the option, an address (e.g. such as a uniform resource locator (URL)) to the webpage is provided. Additionally, the caller may be given a password or other type of access code to enable the caller to access personalized information or a personalized hyperlink via a website associated with the identified webpage. However, if the caller declines the option to access the webpage, the current call with the call center 110 is allowed to continue. To determine whether the caller accepts or declines the option to access the webpage, the example call center 110 may employ, for example, voice recognition technology to process a verbal response (e.g., a predetermined spoken word) by the caller to the offer. Additionally or alternatively, the example call center 110 may employ touchtone detection technology to process a touchtone entry (e.g., DTMF) in response to the offer to terminate the call and access the identified webpage. Additionally or alternatively, the example call center 110 may employ teletype (TTY) detection technology to process a TTY entry (e.g., a Baudot code) in response to the offer to terminate the call and access the identified webpage.

Figure 2:
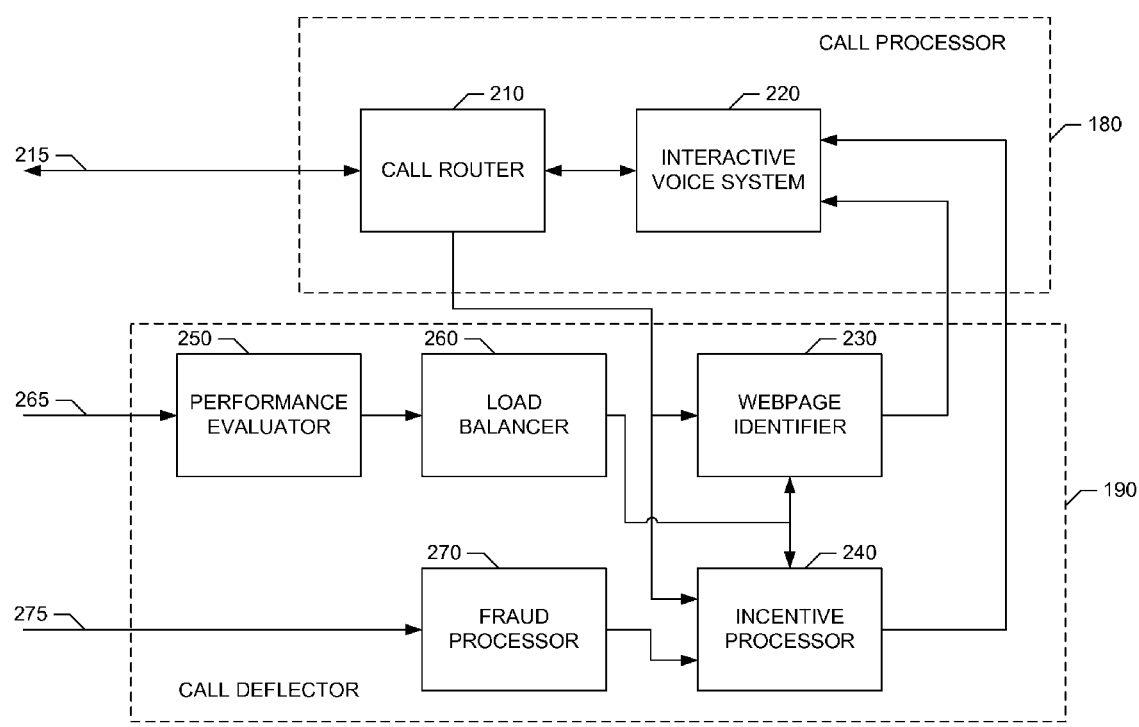
FIG. 2 is a block diagram of an example call processor and an example call deflector that may be used to implement the example caller support system of FIG. 1.

A detailed block diagram of the example call processor 180 and the example call deflector 190 of FIG. 1 is shown in FIG. 2. As discussed above, the example call processor 180 and the example call deflector 190 may be used to implement the example call center 110 in the example caller support system 100 of FIG. 1. The example call processor 180 of FIG. 2 includes a call router 210 to route incoming calls received via a call interface 215 to, for example, an appropriate destination within the call center 110, another call center, or any other appropriate destination for an incoming call. The call router 210 of the illustrated example implements automatic call routing techniques to determine information characterizing an incoming call received via the call interface 215. The characterizing information may include, for example, caller identification information, such as a name, address, phone number, account information, etc., associated with, for example, the caller placing the incoming call. The characterizing information may also include information classifying the purpose of the call, such as, for example, a request for customer support, an intent to purchase a product or service, associated product or service information, etc. The call router 210 determines the characterizing information from one or more sources, such as, for example, from a caller identification (ID) service, from touchtone entries, TTY entries (e.g., Baudot codes) and/or speech (e.g., verbal responses corresponding to a set of possible spoken words) provided by the caller in response to prompts for information, etc.

The example call processor 180 of FIG. 2 also includes an interactive voice system 220. The interactive voice system 220 of the illustrated example provides information in verbal form to a caller associated with an incoming call received via the call interface 215. The verbal information provided by the interactive voice system 220 may include general messages presented to all callers. The general messages may include, for example, a welcome message, prompts to the caller to make touchtone entries, TTY entries and/or or to speak particular words to, for example, identify the caller, determine the purpose of the call, etc.

The verbal information provided by the interactive voice system 220 may also include specific information tailored to a particular caller. The interactive voice system 220 may use the characterizing information determined by the call router 210 to determine one or more specific messages from a set of possible messages to present to the particular caller. For example, the interactive voice system 220 may use the characterizing information to provide prompts to the caller tailored to specific products or services of interest to the caller, options for customer support, etc. Additionally, and as discussed in greater detail below, the interactive voice system 220 will, if appropriate, provide a prompt to the caller to access a webpage in lieu of continuing the call with the call center 110.

The interactive voice system 220 may also employ speech processing techniques to process words and/or phrases spoken by the caller. The words and/or phrases spoken by the caller may be in response to prompts by the interactive voice system 220 to allow the call router 210 to determine characterizing information associated with the incoming call. Furthermore, the interactive voice system 220 may use speech processing techniques to determine whether the caller accepts or declines an offer to access a webpage in lieu of continuing the call with the call center 110.

To enable a call center, such as the example call center 110 of FIG. 1, to provide a caller with an option of accessing a webpage in lieu of continuing the call, the example call deflector 190 of FIG. 2 includes a webpage identifier 230. The webpage identifier 230 of the illustrated example accepts the characterizing information determined by the call router 210. The webpage identifier 230 uses the characterizing information to identify an appropriate webpage from a set of possible webpages to provide to the caller. The set of possible webpages may be associated with a single website or a plurality of websites. For example, the webpage identifier 230 may employ action-object technology to identify one or more webpages relevant to the characterizing information associated with the call. The one or more identified webpages may be associated with one or more websites. Additionally or alternatively, other techniques, such as heuristics, may be used by the webpage identifier 230. Furthermore, the action-object technology, heuristics, etc., may be implemented external to the webpage identifier 230 (such as, for example, in the example call processor 180) and the results of the action-object technology, heuristics, etc., provided to the webpage identifier 230.

The webpage identifier 230 may also employ one or more searching techniques to rank the set of possible webpages based on the characterizing information associated with the incoming call. The webpage identifier 230 may then identify the webpage having the highest rank as being the personalized webpage to provide to the caller. Additionally, the webpage identifier 230 may select a default, general webpage when the characterizing information does not permit identification of an appropriate, personalized webpage. For example, if the rankings of the webpages based on the characterizing information do not exceed a threshold, the webpage identifier 230 may select the default, general webpage instead. After identifying the webpage tailored for the incoming call, the webpage identifier 230 provides the identified webpage to the interactive voice system 220 for presentation to the caller, for example, after the caller consents to terminate the incoming call.

The example call deflector 190 of FIG. 2 also includes an incentive processor 240 to determine incentives to provide to a caller associated with an incoming call received via the call interface 215 to access an identified webpage in lieu of continuing the call with the call center 110. The incentives offered to the caller in return for terminating the current call and, instead, accessing the identified webpage may include, for example, monetary rewards, new services, a reduced time to obtain assistance via the webpage than to wait for a customer representative, an improved position in the call waiting queue for a subsequent call, etc. For example, monetary rewards may be in the form of coupons, discounts, account credits, etc. Monetary rewards may also take the form of additional minutes of service provided to the caller, such as, for example, additional minutes of long distance service, additional minutes of wireless service, etc. Additionally, a monetary reward, a new service, etc., may be credited to the caller's account based on the characterizing information associated with the incoming call as determined by the call router 210 (e.g., such as account information entered by the caller in response to automated call-routing prompts provided by the interactive voice system 220).

Additionally or alternatively, the incentive processor 240 may decide to offer the caller a guaranteed, improved position in a future call waiting queue if the caller accesses the identified webpage but does not obtain sufficient information, customer support, problem resolution, etc. For example, preferential positioning may be achieved through any or all of: (1) a voice-over-IP (VoIP) system using a click-to-call function on the identified webpage; (2) a special code provided to the caller that may be entered when the caller places a subsequent call to the call center 110; (3) a special phone number to contact the call center 110, etc. After determining the appropriate incentive or incentives to offer the caller, the incentive processor 240 of the illustrated example provides the list of incentives to the interactive voice system 220 for presentation to the caller.

The example call deflector 190 of FIG. 2 also includes a performance evaluator 250 and a load balancer 260 to determine whether the caller associated with an incoming call received via the call interface 215 should be given the option of accessing a webpage in lieu of continuing the call. For example, the performance evaluator 250 and the load balancer 260 can control whether the webpage identifier 230 identifies a webpage for the caller based on the current status of the call center 110. Similarly, the performance evaluator 250 and the load balancer 260 allow the incentive processor 240 to determine whether and what types of incentives should be offered to encourage the caller to access the webpage in lieu of continuing the call.

For example, the performance evaluator 250 of the illustrated example is configured to monitor the call center 110 via a monitoring interface 265 to determine metrics associated with the performance of the call center 110. Such metrics may include, for example, a current mean time to answer calls, a current mean score for a caller feedback survey, a current traffic load estimate, etc. The load balancer 260 of the illustrated example processes the metrics determined by the performance evaluator 250 to determine whether the call center 110 is meeting certain business requirements. For example, the load balancer 260 may use the metrics to compute an expected time to process an incoming call. Additionally or alternatively, the load balancer 260 may compare the current mean time to process an incoming call against a threshold time to answer calls. Additionally or alternatively, the load balancer 260 may compare the current mean survey score against a target score for the customer feedback survey. Additionally or alternatively, the load balancer 260 may compare the current traffic load estimate against a traffic load target, etc.

The load balancer 260 of the illustrated example uses the results of its comparison to perform load balancing as appropriate. For example, when the call center 110 begins experiencing high traffic loads (or performance associated with high traffic loads, such as, for example, high current mean call processing times, poor mean customer survey scores, etc.), the load balancer 260 may increase the likelihood of deflecting incoming calls to one or more identified webpages by causing the incentive processor 240 to increase the number and/or value of the incentives offered to incoming callers. Additionally or alternatively, the load balancer 260 may cause the incentive processor 240 to increase the number and/or types of incentives during a single call with a single caller to encourage the caller to access an identified webpage in lieu of continuing the call with the call center 110.

To prevent fraud and/or gaming by people attempting to improperly obtain incentives offered to callers for accessing an identified webpage in lieu of continuing a call with the call center 110, the example call deflector 190 of FIG. 2 also includes a fraud processor 270. The fraud processor 270 of the illustrated example is configured to ensure that a caller attempts to obtain the requested information from the identified webpage prior to receiving the one or more offered incentives. Additionally or alternatively, the fraud processor 270 may track the frequency of incentive use per caller. For example, the identified webpage provided to the caller may use cookies to determine whether the caller actually accesses the webpage, as well as the amount of time the caller spends accessing the webpage. Path analysis may also be used to determine whether the path a caller took in answering questions on the website associated with the identified webpage corresponded to a valid attempt to obtain information or corresponded to merely a series of random responses intended for the sole purpose of receiving the offered incentive(s).

A fraud monitoring interface 275 receives the cookie information and/or the results of the path analysis for use by the fraud processor 270. The fraud processor 270 of the illustrated example processes this information and indicates to the incentive processor 240 whether the incentives offered to a particular caller should be honored, credited to the caller's account, actually provided to the caller if the incentives have not already been provided, etc. Additionally or alternatively, if improper activity is detected, the fraud processor 270 may signal the incentive processor 240 to bar a particular caller from receiving incentives indefinitely, for a predetermined duration of time, etc.

Flowcharts representative of example machine readable instructions that may be executed to implement the example call processor 180 of FIGS. 1 and/or 2, the example call deflector 190 of FIGS. 1 and/or 2, and/or the example call router 210, the example interactive voice system 220, the example webpage identifier 230, the example incentive processor 240, the example performance evaluator 250, the example load balancer 260 and/or the example fraud processor 270 of FIG. 2 are shown in FIGS. 3A-3B, 4 and 5. In these examples, the machine readable instructions represented by each flowchart may comprise one or more programs for execution by: (a) a processor, such as the processor 612 shown in the example computer 600 discussed below in connection with FIG. 6, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 612, but persons of ordinary skill in the art will readily appreciate that the entire program or programs and/or portions thereof could alternatively be executed by a device other than the processor 612 and/or embodied in firmware or dedicated hardware (e.g., implemented by an application specific integrated circuit (ASIC), a programmable logic device (PLD), a field programmable logic device (FPLD), discrete logic, etc.). For example, any or all of the example call processor 180, the example call deflector 190, the example call router 210, the example interactive voice system 220, the example webpage identifier 230, the example incentive processor 240, the example performance evaluator 250, the example load balancer 260 and/or the example fraud processor 270 could be implemented by any combination of software, hardware, and/or firmware. Also, some or all of the machine readable instructions represented by the flowchart of FIGS. 3A-3B, 4 and/or 5 may be implemented manually. Further, although the example machine readable instructions are described with reference to the flowcharts illustrated in FIGS. 3A-3B, 4 and 5, persons of ordinary skill in the art will readily appreciate that many other techniques for implementing the example methods and apparatus described herein may alternatively be used. For example, with reference to the flowcharts illustrated in FIGS. 3A-3B, 4 and 5, the order of execution of the blocks may be changed, and/or some of the blocks described may be changed, eliminated, combined and/or subdivided into multiple blocks.

Figure 3A:
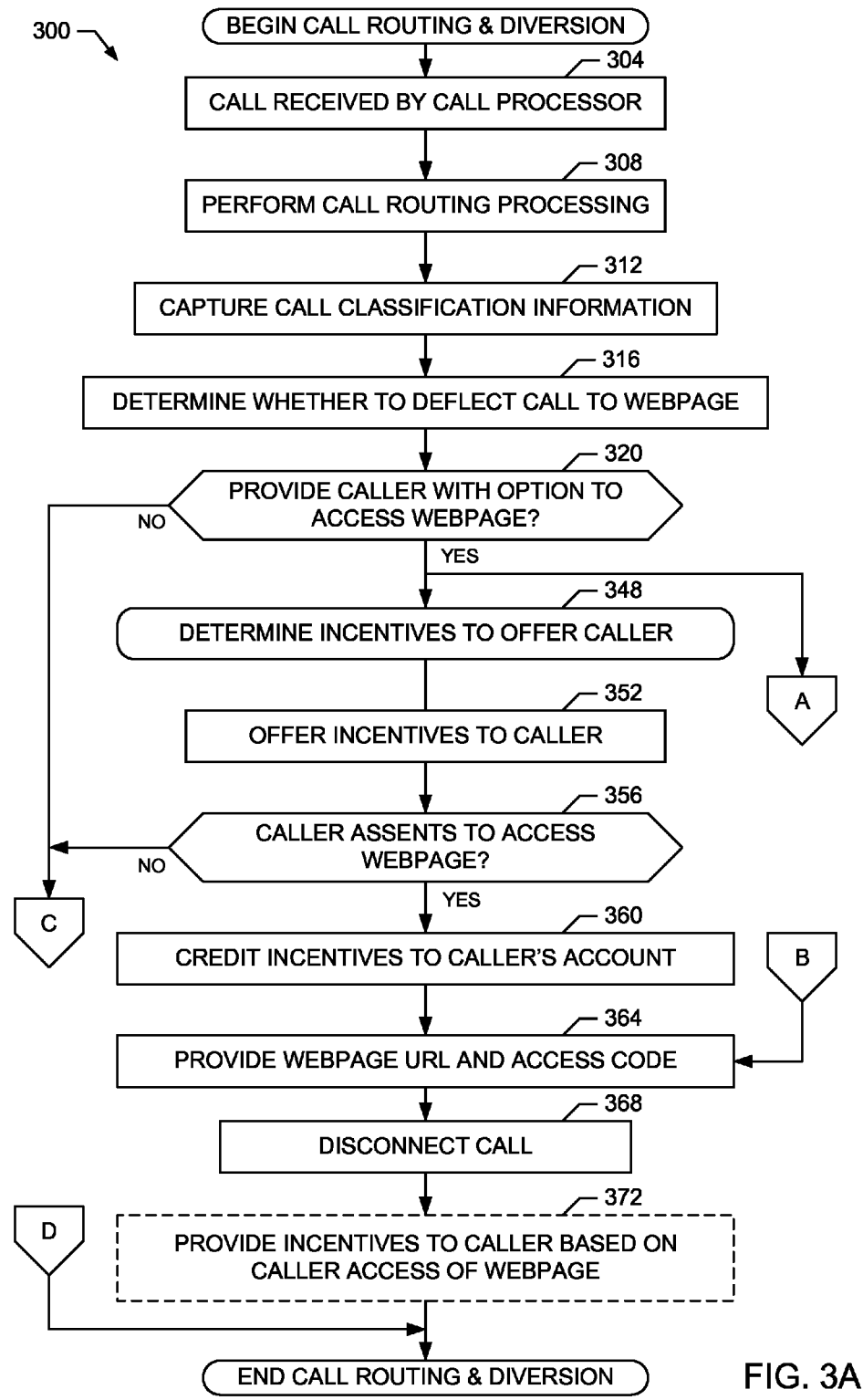
FIGS. 3A-3B collectively form a flowchart representative of example machine readable instructions that may be executed to implement the example call processor and/or the example call deflector of FIG. 2.
Figure 3B:
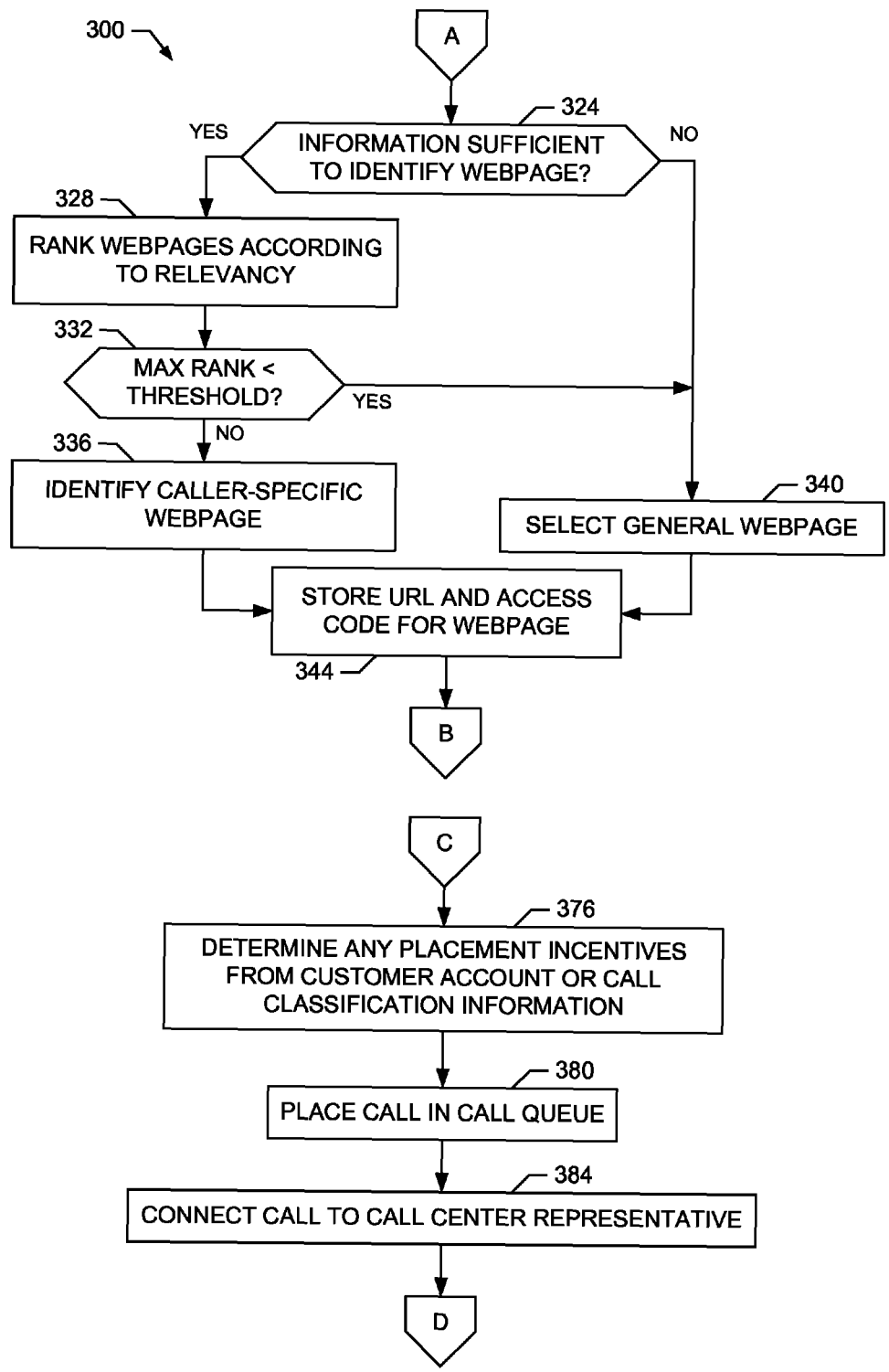

Example machine readable instructions 300 that may be executed to implement the example call processor 180 and/or the example call deflector 190 of FIGS. 1 and/or 2 are shown in FIGS. 3A-3B. The example machine readable instructions 300 may be executed, for example, each time an incoming call is received by the call processor 180 of FIG. 1. Thus, multiple instances of the example machine readable instructions 300 may execute in parallel. The machine readable instructions 300 begin execution at block 304 of FIG. 3A at which the example call router 210 included in the example call processor 180 of FIG. 2 receives an incoming call via the call interface 215. The caller may place the incoming call from, for example, the mobile phone 120 or land line phone 130 of FIG. 1.

Next, control proceeds to block 308 at which the call router 210 processes the incoming call to determine characterizing information for routing the call to the appropriate destination. As discussed above in connection with FIG. 2, the characterizing information may include, for example, caller identification information, information classifying the purpose of the call, etc. The call router 210, at block 308, may determine the characterizing information from, for example, a caller ID service, touchtone entries, TTY entries and/or speech (e.g., verbal responses) provided by the caller in response to prompts for information, etc. Then, at block 312, the call router 210 classifies and stores the characterizing information determined at block 308 and associated with the present incoming call received at block 304. Additionally or alternatively, at block 312 the call router 210 may classify and store the purpose of the call received at block 304. The purpose of the call may be expressed, for example, using action-objects determined from the characterizing information from action-object technology. Control then proceeds to block 316.

At block 316, the load balancer 260 included in the example call deflector 190 of FIG. 2 determines whether an attempt should be made to deflect the incoming call received at block 304 to an identified webpage. For example, the load balancer 260 may perform load balancing by comparing performance metrics associated with the call center 110 to one or more targets based on business requirements. Then, at block 316, the load balancer 260 may determine whether the traffic load exceeds the desired capacity of the call center 110 and, if so, enable the caller associated with the current incoming call to be deflected to a webpage in lieu of continuing the call with the call center 110.

Control then proceeds to block 320 at which the example webpage identifier 230 and/or the example incentive processor 240 included in the example call deflector 190 determines whether to provide the caller with the option of accessing an identified webpage in lieu of continuing the incoming call with the call center 110. If the caller is to be given the option of accessing the webpage (block 320), control proceeds to block 324 of FIG. 3B. At block 324, the webpage identifier 230 determines whether the characterizing information classified and stored by the call router 210 at block 312 is sufficient to enable identification of a webpage personalized to the particular caller associated with the current incoming call. If the characterizing information is sufficient (block 324), control proceeds to block 328 at which the webpage identifier 230 uses the characterizing information to rank a set of possible webpages based on their relevancy to the incoming call. Any appropriate searching technique may be used to rank the webpages at block 328. Additionally or alternatively, at block 328 a table of webpage destinations may be used to match the purpose of call with one or more relevant webpages.

Next, control proceeds to block 332 at which the webpage identifier 230 determines whether all of the rankings of the set of webpages are less than a predetermined threshold. For example, at block 332 the webpage identifier 230 may simply examine the maximum rank and determine whether it is less than a relevancy threshold. If the maximum ranking is not less than the threshold (block 332), control proceeds to block 336 at which the webpage identifier 230 identifies the webpage having the maximum ranking to be the personalized webpage to be provided to the caller. If, however, the maximum ranking is less than the threshold (block 332), or if the characterizing information is not sufficient to identify a personalized webpage (block 324), control proceeds to block 340. At block 340, the webpage identifier 230 selects a default, general webpage to provide to the caller instead of a personalized webpage. For example, the general webpage may correspond to a homepage of the call center 110 or a business operating the call center 110.

After a personalized webpage is identified at block 336 or a general webpage is selected at block 340, control proceeds to block 344 at which the address (e.g., URL) for the webpage is stored by the webpage identifier 230 for presenting to the caller. Additionally, at block 344 the webpage identifier 230 may store an access code, password, etc., to provide to the caller to allow access to individualized information via the identified webpage.

Figure 4:
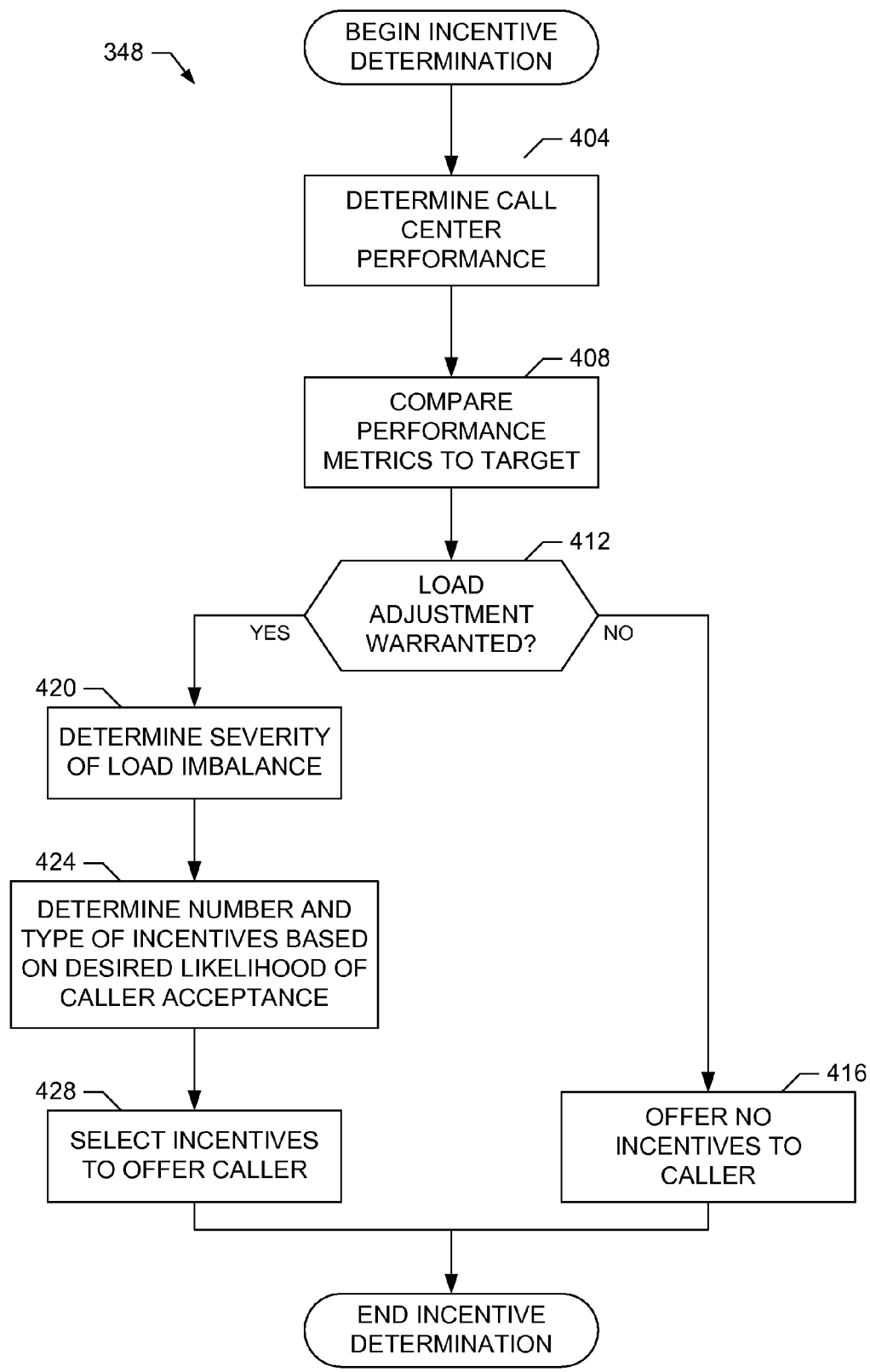
FIG. 4 is a flowchart representative of example machine readable instructions that may be executed to implement an example incentive processor for use by the example call deflector of FIG. 2.

Returning to block 320 of FIG. 3A, if the caller is to be given the option of accessing the webpage, control also proceeds block 348. For example, control may proceed to both block 348 at block 324 of FIG. 3B in parallel to enable parallel processing implementations. At block 348, the incentive processor 240 determines whether an incentive should be offered to the caller to access an identified webpage in lieu of continuing the call with the call center 110. Additionally, at block 348 the incentive processor 240 may determine the number and/or types of incentives to be offered to the caller to encourage the caller to terminate the current call in favor of accessing the webpage. As discussed above in connection with FIG. 2, example incentives include monetary rewards, new services, a reduced time to wait for assistance via the webpage, an improved position in the call waiting queue for a subsequent call, etc. Example machine readable instructions that may be used to implement the processing at block 348 are shown in FIG. 4 and discussed in greater detail below.

Next, control proceeds to block 352 at which the incentive processor 240 indicates to the interactive voice system 220 included in the example call processor 180 which incentives are to be presented to the caller. At block 352 the interactive voice system 220 then provides (e.g., verbally) the caller with the option to access an identified webpage in lieu of continuing the current call. Additionally, the interactive voice system 220 presents (e.g., verbally) the incentives to encourage the caller to terminate the call and access the identified webpage. The interactive voice system 220 then concludes with an invitation to the caller to accept the option of accessing the webpage by, for example, entering a touchtone command (e.g., by pressing a key on the mobile phone 120 or land line phone 130), entering a TTY command and/or by speaking a predetermined word or phrase. Control then proceeds to block 356.

At block 356 the interactive voice system 220 determines whether the caller accepts or declines the offer to access the identified webpage in lieu of continuing the current call with the call center 110. For example, the interactive voice system 220 may employ touchtone detection techniques, TTY detection techniques and/or speech processing techniques to accept a response provided by the caller. If the caller accepts the offer to terminate the call and access the webpage (block 356), control proceeds to block 360 at which the incentive processor 240 credits any offered incentives to the caller's account. Additionally or alternatively, at block 360 the interactive voice system 220 may present the caller with incentives in the form of special redemption codes, telephone numbers, etc., to gain preferential call center treatment in the future, etc. In some example implementations, the processing at block 360 will not be performed until after the caller performs a valid access of the identified website (e.g., as determined by fraud processor 270 at block 372 discussed below). Control then proceeds to block 364 at which the interactive voice system 220 provides the caller with the identified webpage stored by the webpage identifier 230 at block 344 of FIG. 3B. Then, at block 368 the call processor 180 terminates the current incoming call or, alternatively, the caller terminates the call.

Sometime thereafter, the caller accesses the identified webpage and such access is reported to, for example, the example fraud processor 270 included in the example call deflector 190 via the fraud monitoring interface 275. The fraud processor 270 processes the reported information and indicates the results to the incentive processor 240. Then, at block 372 of FIG. 3A, the incentive processor 240 may credit one or more incentives to the caller's account based on the caller's access of the webpage. Additionally or alternatively, the incentive processor 240 may implement incentives, such as assigning the caller to a higher priority queue during a subsequent call to the call center, etc. Execution of the example machine readable instructions 300 then end.

If, however, at block 320 the load balancer 260 decides not to give the caller the option of accessing an identified webpage in lieu of continuing the call with the call center, or the caller declines the option (block 356), control proceeds to block 376 of FIG. 3B. At block 376, the incentive processor 240 determines whether the incoming call should be given preferential placement in the call waiting queue. Such preferential placement may be earned, for example, by the caller accepting an offer to access an identified webpage during a previous call. The incentive processor 240 may determine, at block 376, whether preferential placement is warranted, for example, by: (1) processing a click-to-call function used to place the current incoming call from a previously identified webpage; (2) receiving a special code entered by the caller; (3) determining that the incoming call was placed to a special telephone number, etc.

Next, control proceeds to block 380 at which the call processor 180 routes the incoming call to the appropriate place in the call waiting queue. Then, when the incoming call reaches the front of the queue, control proceeds to block 384 at which the incoming call is routed to the appropriate (e.g., next available) call center representative. Execution of the example machine readable instructions 300 then ends.

Example machine readable instructions 348 that may be used to implement the processing at block 348 of FIG. 3A are shown in FIG. 4. Execution of the example machine readable instructions 348 of FIG. 4 begins at block 404 at which the performance evaluator 250 included in the example call deflector 190 of FIG. 2 determines performance metrics associated with, for example, the call center 110 of FIG. 1. As discussed above in connection with FIG. 2, such metrics may include, for example, a current mean time to answer calls, a current mean score for a caller feedback survey, a current traffic load estimate, etc.

Next, control proceeds to block 408 at which the load balancer 260 included in the example call deflector 190 compares the performance metrics determined at block 404 with one or more predetermined targets based on business requirements. For example, and as discussed above in connection with FIG. 2, the load balancer 260, at block 408, may compare any or all of the current mean time to answer calls against a threshold time to answer calls, the current mean survey score against a target score for a caller feedback survey, the current mean traffic load against a traffic load target and/or self-service automation target(s), etc. Control then proceeds to block 412 at which the load balancer 260 determines whether the analysis of the performance metrics indicates that a load adjustment is required. For example, at block 412 the load balancer 260 may determine, based on the processing at block 408, that the current traffic load is greater than a traffic load target and, thus, the load should be reduced. Additionally or alternatively, at block 412 the load balancer 260 may determine that the current mean time to answer calls exceeds a threshold time and, thus, the traffic load should be reduced. Additionally or alternatively, at block 412 the load balancer 260 may determine that the current mean customer survey score does not meet a target score and, thus, the traffic load should be reduced.

If the load balancer 260 determines that no load adjustment is warranted (block 412), control proceeds to block 416 at which the load balancer 260 indicates to the incentive processor 240 included in the example call deflector 190 that no incentives are to be offered to the caller associated with the current incoming call. Execution of the example machine readable instructions 348 then ends. If, however, load adjustment is warranted (block 412), control proceeds to block 420 at which the load balancer determines the severity of the load imbalance and, thus, the amount of load adjustment that needs to be performed. For example, at block 420 the load balancer 260 may determine by how much the current traffic load exceeds one or more target levels.

Next, control proceeds to block 424 at which the incentive processor 240 determines the number and/or types of incentives to offer the caller based on the severity determination made by the load balancer 260 at block 420. For example, if the severity is high, the incentive processor 240 may increase the number and/or value of the incentives offered to the caller associated with the incoming call to increase the likelihood of deflecting incoming call to the identified webpage. Control then proceeds to block 428 at which the incentive processor 240 selects one or more particular incentives to offer to the caller. The incentive processor 240 also indicates the selected incentive(s) to the interactive voice system 220 included in the example call processor 180 for presentation to the caller. Execution of the example machine readable instructions 348 then ends.

Figure 5:
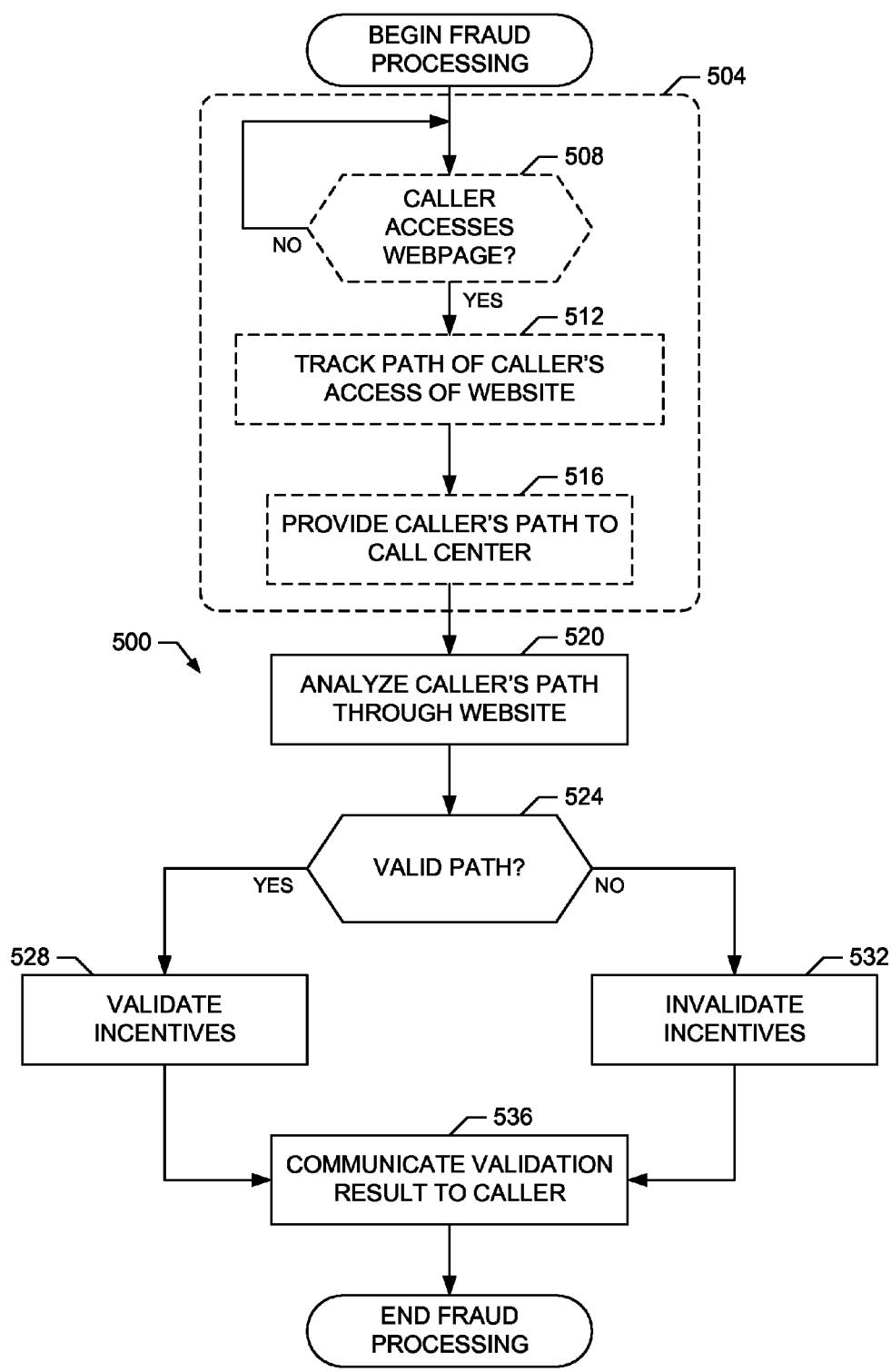
FIG. 5 is a flowchart representative of example machine readable instructions that may be executed to implement an example fraud processor for use by the example call deflector of FIG. 2.

Example machine readable instructions 500 that may be used to implement fraud processing for the example call processor 180 and/or the example call deflector 190 of FIG. 2 are shown in FIG. 5. The example machine readable instructions 500 may be executed, for example, in response to a caller's access of an identified webpage provided to the caller as an alternative to continuing a call with the call center 110. For example, execution of the example machine readable 500 shown in FIG. 5 begins in response to the execution of the example machine readable instructions 504 by the web server (e.g., one of the web servers 140 of FIG. 1) serving the identified webpage accessed by the caller. Execution of the example machine readable instructions 504 begins at block 508 at which the web server 140 determines whether the caller accessed the identified webpage.

If the caller accesses the identified webpage (block 508), control proceeds to block 512 at which the web server performs a path analysis to determine the path the caller took in traversing the website associated with the identified webpage. For example, at block 512 the web server 140 may determine whether the path a caller took in answering questions on the website corresponded to a valid attempt to obtain information or corresponded to a series of random responses intended for the sole purpose of receiving the offered incentive(s). At block 512 the web server 140 may also determine whether the caller has a history of obtaining incentives via the web server 140. Control then proceeds to block 516 at which the web server 140 provides the caller's path (and any incentive history, if appropriate) to the call center 110 via, for example, the fraud monitoring interface 275.

Upon receipt of the caller's path at the call center 110, execution of the example machine readable instructions begins at block 520 at which the fraud processor 270 included in the example call deflector 190 analyzes the caller's path to determine whether it corresponds to a valid path through the website associated with the identified webpage. At block 524 the fraud processor 270 may also analyze the caller's incentive history to determine whether the caller has a history of obtaining incentives inappropriately. If at block 524 the fraud processor 270 determines that the path is valid (and there is no history of inappropriate incentive acquisition, if applicable), control proceeds to block 528 at which the fraud processor 270 signals the incentive processor 240 included in the example call deflector 190 to validate (e.g., honor) the incentives offered to the caller to access the identified webpage in lieu of continuing a previous call with the call center 110. If however, the fraud processor 270 determines that the path is invalid (or there is a history of inappropriate incentive acquisition, if applicable) (block 524), control proceeds to block 532 at which the fraud processor 270 signals the incentive processor 240 included in the example call deflector 190 to invalidate (e.g., delete) the incentives offered to the caller to access the identified webpage in lieu of continuing a previous call with the call center 110.

After the incentives are validated at block 528 or invalidated at block 532, control proceeds to block 536. At block 536 the incentive processor 240 indicates the results of validating or invalidating the incentives to the interactive voice system 220 included in the example call processor 180. Then, if the caller is currently participating in an active call with the call center 110, the interactive voice system 220 may present the caller (e.g., verbally) with the results of validating or invalidating the previously offered incentives. Execution of the example machine readable instructions then ends.

Figure 6:
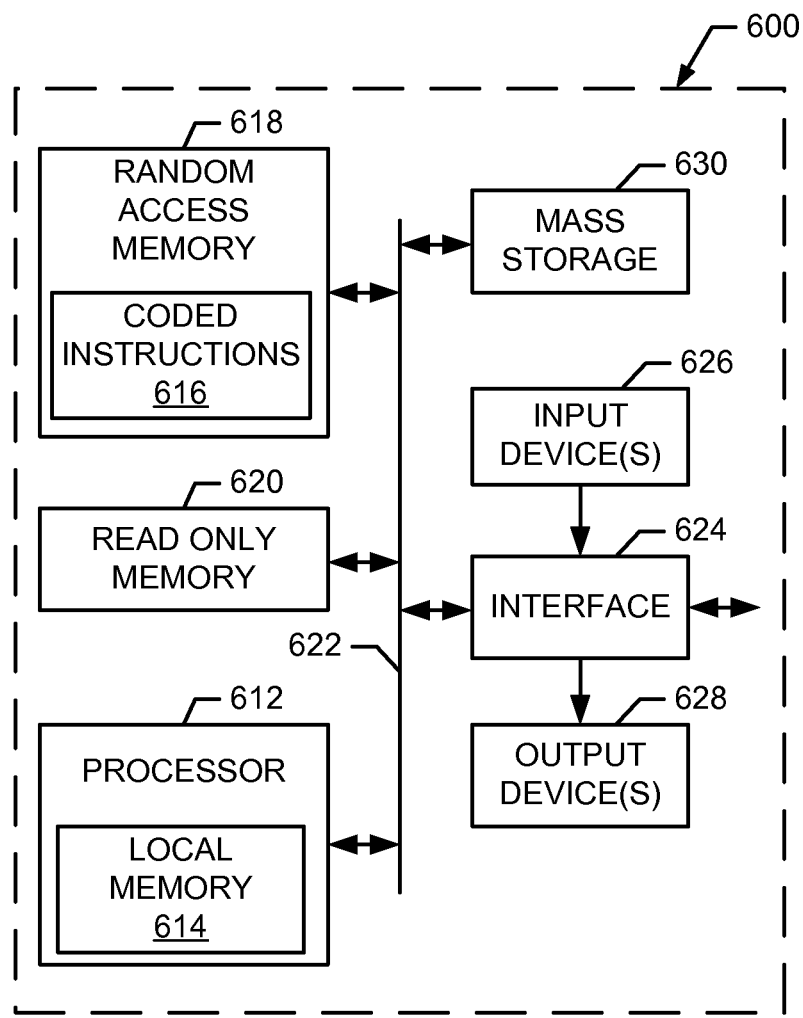
FIG. 6 is a block diagram of an example computer that may execute the example machine readable instructions of FIGS. 3A-3B, 4 and/or 5 to implement the example call processor and/or the example call deflector of FIG. 2.

FIG. 6 is a block diagram of an example computer 600 capable of implementing the apparatus and methods disclosed herein. The computer 600 can be, for example, a server, a personal computer, a personal digital assistant (PDA), an Internet appliance, a DVD player, a CD player, a digital video recorder, a personal video recorder, a set top box, or any other type of computing device.

The system 600 of the instant example includes a processor 612 such as a general purpose programmable processor. The processor 612 includes a local memory 614, and executes coded instructions 616 present in the local memory 614 and/or in another memory device. The processor 612 may execute, among other things, the machine readable instructions represented in FIGS. 3A-3B, 4 and 5. The processor 612 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 612 is in communication with a main memory including a volatile memory 618 and a non-volatile memory 620 via a bus 622. The volatile memory 618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 620 may be implemented by flash memory and/or any other desired type of memory device. Access to the main memory 618, 620 is typically controlled by a memory controller (not shown) in a conventional manner.

The computer 600 also includes an interface circuit 624. The interface circuit 624 may be implemented by any type of interface standard, such as an Ethernet interface, a universal serial bus (USB), and/or a third generation input/output (3GIO) interface.

One or more input devices 626 are connected to the interface circuit 624. The input device(s) 626 permit a user to enter data and commands into the processor 612. The input device(s) can be implemented by, for example, a keyboard, a mouse, a touchscreen, a track-pad, a trackball, an isopoint and/or a voice recognition system.

One or more output devices 628 are also connected to the interface circuit 624. The output devices 628 can be implemented, for example, by display devices (e.g., a liquid crystal display, a cathode ray tube display (CRT)), by a printer and/or by speakers. The interface circuit 624, thus, typically includes a graphics driver card.

The interface circuit 624 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 600 also includes one or more mass storage devices 630 for storing software and data. Examples of such mass storage devices 630 include floppy disk drives, hard drive disks, compact disk drives and digital versatile disk (DVD) drives. The mass storage device 630 may implement storage for the call characterizing information determined by the example call router 210. Alternatively, the volatile memory 618 may implement storage for the call characterizing information determined by the example call router 210.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Furthermore, although the specific examples illustrated herein focus on deflect callers to websites, the example methods and apparatus discussed herein are not limited to deflecting callers only to websites. The example methods and apparatus discussed herein may be readily adapted to deflect incoming calls to one or more target destinations other than a webpage. An example target destination supported by the example methods and apparatus discussed herein includes, but is not limited to, any type of automated call processing device, automated call processing application, etc. Additionally or alternatively, although the specific examples illustrated herein provide that the caller consents to terminate the incoming call prior to receiving the identified webpage's address, the example methods ad apparatus discussed herein are not limited thereto. For example, the methods and apparatus discussed herein may be readily adapted to provide the address information for the identified webpage to the caller before obtaining consent to terminate the call, while allowing the incoming call to continue, etc.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to deflect a caller to a webpage, the method comprising:

receiving a call from the caller at a call center;

identifying, via a processor, a first webpage based on information characterizing the call, wherein identifying the first webpage comprises:

selecting a personalized webpage from a plurality of personalized webpages to be the first webpage when a relevancy ranking determined for the personalized webpage based on the information characterizing the call is determined to be greater than a threshold; and selecting a default webpage different from the plurality of personalized webpages to be the first webpage when a maximum relevancy ranking among the plurality of personalized webpages is determined to be less than the threshold;

providing, via the processor, an incentive to the caller to terminate the call and access the first webpage; and after determining that the caller has consented to terminate the call and access the first webpage, presenting, via the processor, an address of the first webpage to the caller and automatically terminating the call at the call center, the address and the incentive being provided in a manner requiring the first webpage to be accessed by the caller after the call is terminated.

2. The method as defined in claim 1, wherein the plurality of personalized webpages is associated with a website.

3. The method as defined in claim 1, wherein the plurality of personalized webpages is associated with a plurality of websites.

4. The method as defined in claim 1, wherein the call comprises at least one of a public switched telephone network call, a voice-over-internet-protocol call, a mobile phone call or a satellite phone call.

5. The method as defined in claim 1, wherein the characterizing information comprises at least one of caller identification information, a touchtone entry provided by the caller in response to a prompt, a teletype entry provided by the caller in response to a prompt, or speech provided by the caller in response to a prompt.

6. The method as defined in claim 1, wherein identifying the first webpage further comprises:

ranking the plurality of personalized webpages according to relevancy based on the characterizing information.

7. The method as defined in claim 6, further comprising, when at least two of the personalized webpages have substantially the same relevancy ranking, selecting between the at least two personalized webpages having substantially the same relevancy ranking based on a criterion.

8. The method as defined in claim 7, wherein the criterion comprises at least one of a stored ranking metric, a historical customer preference, a historical supplier preference, historical sales statistics associated with the at least two personalized webpages, or a pseudo random identifier.

9. The method as defined in claim 1, wherein identifying the first webpage further comprises matching a purpose of the call to a table of webpages, and the purpose of the call is determined based on the characterizing information.

10. The method as defined in claim 1, wherein the address of the first webpage comprises a uniform resource locator.

11. The method as defined in claim 1, further comprising determining whether the caller consents to terminate the call by at least one of determining whether the caller has spoken a termination word or whether the caller has provided a termination entry in response to a request to terminate the call and access the first webpage.

12. The method as defined in claim 1, wherein the incentive comprises at least one of a monetary reward, a new service or a promise of preferential processing of a subsequent call by the caller.

13. The method as defined in claim 1, wherein the call is a first call and further comprising providing contact information to the caller through the first webpage, the contact information to be used to provide preferential processing of a second call from the caller.

14. The method as defined in claim 1, further comprising determining whether to deflect the caller to the first webpage based on an expected time to process the call.

15. The method as defined in claim 14, wherein determining whether to deflect the caller to the first webpage comprises determining whether the expected time to process the call exceeds a threshold time to process incoming calls.

16. The method as defined in claim 1, further comprising determining whether to award the incentive based on determining whether the caller performs a valid access of the first webpage.

17. The method as defined in claim 16, wherein determining whether the caller performs a valid access of the first webpage comprises conducting a path analysis of a response given by the caller to at least one question prompted by the first webpage.

18. A tangible machine readable storage medium comprising machine readable instructions which, when executed, cause a machine to perform operations comprising:
    identifying a webpage based on information characterizing a call from a caller, the call being received at a call center, wherein identifying the first webpage comprises:
        selecting a personalized webpage from a plurality of personalized webpages to be the first webpage when a relevancy ranking determined for the personalized webpage based on the information characterizing the call is determined to be greater than a threshold; and
        selecting a default webpage different from the plurality of personalized webpages to be the first webpage when a maximum relevancy ranking among the plurality of personalized webpages is determined to be less than the threshold;
    providing an incentive to the caller to terminate the call and access the first webpage; and
    after determining that the caller has consented to terminate the call and access the first webpage, presenting an address of the first webpage to the caller and automatically terminating the call at the call center, the address and the incentive being provided in a manner requiring the first webpage to be accessed by the caller after the call is terminated.

19. A call deflector to deflect incoming calls to a set of webpages, the call deflector comprising:
    a memory having instructions stored thereon; and
    a processor to execute the instructions to perform operations comprising:
        obtaining information characterizing an incoming call received at a call center from a caller;
        selecting a first webpage from the set of webpages based on the characterizing information corresponding to the incoming call, wherein selecting the first webpage comprises (1) selecting a personalized webpage from a plurality of personalized webpages to be the first webpage when a relevancy ranking determined for the personalized webpage based on the information characterizing the call is determined to be not less than a threshold, and (2) selecting a default webpage different from the plurality of personalized webpages to be the first webpage when a maximum relevancy ranking among the plurality of personalized webpages is determined to be less than the threshold;
        providing an incentive to the caller to terminate the incoming call and access the first webpage; and
        after determining that the caller has consented to terminate the call and access the first webpage, presenting an address of the first webpage to the caller and automatically terminating the incoming call at the call center, the address and the incentive being provided in a manner requiring the first webpage to be accessed by the caller after the call is terminated.

20. The call deflector as identified in claim 19, wherein the characterizing information comprises at least one of caller identification information, a touchtone entry provided by the caller in response to a prompt, a teletype entry provided by the caller in response to a prompt, or speech provided by the caller in response to a prompt.

21. The call deflector as identified in claim 19, wherein the operations further comprise assigning relevancy rankings to the plurality of personalized webpages based on the characterizing information.

* * * * *